United States Patent [19]

Wells

[11] 4,111,149
[45] Sep. 5, 1978

[54] OPTICAL STRUCTURE FOR MICROFICHE READER
[75] Inventor: Thomas R. Wells, Des Plaines, Ill.
[73] Assignee: Bell & Howell Company, Chicago, Ill.
[21] Appl. No.: 716,740
[22] Filed: Aug. 23, 1976

Related U.S. Application Data
[63] Continuation of Ser. No. 532,802, Dec. 16, 1974, abandoned.
[51] Int. Cl.² .......................................... G03B 21/22
[52] U.S. Cl. ..................................... 353/78; 353/101; 353/119; 353/87
[58] Field of Search ................. 353/71, 72, 73, 74–79, 353/39, 119, 122

[56] References Cited

U.S. PATENT DOCUMENTS

| | | | |
|---|---|---|---|
| 1,153,685 | 9/1915 | Fuerzoni | 353/78 |
| 1,862,577 | 6/1932 | Matthews | 353/51 |
| 2,170,967 | 8/1939 | Eppenstein et al. | 353/39 |
| 2,177,638 | 10/1939 | Draeger | 353/78 |
| 2,482,666 | 9/1949 | Gradisar | 353/71 |
| 3,733,121 | 5/1973 | Smitzer | 353/87 X |
| 3,781,102 | 12/1973 | Chandler | 353/27 R |
| 3,848,982 | 11/1974 | Shoji | 353/87 X |

FOREIGN PATENT DOCUMENTS 480,659 12/1969 Switzerland ..................... 353/78

Primary Examiner—Harry N. Haroian
Attorney, Agent, or Firm—Harry G. Thibault; Alan B. Samlan

[57] ABSTRACT

A microfiche reader providing varying optical paths of projection of a microfiche image. Variable hood means provide self-contained viewing, or projection of the image on a screen, wall or ceiling. The light source for the reader may be removed and readily replaced without the operator touching the sensitive lamp. Dual image forming floating lenses having a universal focusing system provide multiple magnification capabilities with uniform focusing in all positions of the microfiche. Additional means prevent chipping of the glass plates holding the microfiche when the floating lenses are removed from contact with the glass plates.

7 Claims, 9 Drawing Figures

OPTICAL STRUCTURE FOR MICROFICHE READER

This is a continuation of application Ser. No. 532,802 filed Dec. 16, 1974 now abandoned.

This invention relates to microfiche readers and more particularly to the optical path in such readers for projecting images photocopied on microfiche.

The term "module" is used herein to mean "any in a series of standardized units for use together, or a packaged functional assembly for use with other packaged functional assemblies." Examples of such modules in this invention are a hood, a light source tray, and a base unit, which are described more fully hereinafter.

Microfiche film is a known form of graphic data presentation wherein a number of pages or images are photographically reproduced on a single "card" of microfiche film (such as a card of 3 × 5 inches to 4 × 6 inches, for example). Any suitable number of pages (up to, say, a thousand or so) may be photographically formed in an orthogonal array on a single microfiche "card" of photographic film. The microfiche film may then be placed in an optical reader and moved over a rectilinear path until an image or a selected page is in an optical projection path leading to a display screen.

It is uneconomical to provide a microfiche reader system for a single microfiche card; therefore, the user is likely to have an entire library file including many microfiche which must be kept in a specific order for quick recall. Therefore, microfiche readers are adapted to file and store a quantity of microfiche in a library file, remove and mechanically manipulate the microfiche, and then refile it in the library file. The mechanical manipulation of a microfiche involves sliding the microfiche into and out of the library file, moving it in a path in X and Y directions, and projecting a selected image in the orthogonal array through the optical path of a projector. Hence, mechanical microfiche reader equipment may be designed to find and select the desired one of the many microfiche images in the library file and to project it without damage. Then, the microfiche must be safely returned to the library file for storage.

The preferred reader is a compact unit which may be carried about if need be. The optical path must be long enough to increase the very small photocopy image to an easily readable size. Still, it should be short enough to provide a fairly compact unit. In addition, the unit disclosed herein could be either completely self-contained for projection on its own screen, or could be set up for projection on a wall, ceiling or a separate screen.

Accordingly, an object of the invention is to provide microfiche readers with new and improved optical paths. In greater detail, an object is to provide microfiche readers which may be either self-contained or a projector for a ceiling, wall, or separate screen. Here, an object is to provide a number of mechanical parts which may be assembled in different ways so that the reader may be operated to project in different paths.

Another object of the invention is to provide a simple and obvious operation which may be used by people who have no special training in the use of a microfiche reader. An additional object is to enable a casual patron of a public library, for example, to use the reader with only the simplest of instructions. In particular, an object is to provide a microfiche reader where even simple maintenance may be performed by persons having little or no training.

Still another object is to provide a microfiche reader which is easily focused, which switches projection scales, and which maintains accurate focus despite minor misalignments of mechanical parts.

In keeping with an aspect of the invention, these and other objects are accomplished by providing a microfiche reader having two preferably separately packaged mechanical units which may be alternatively put together to project along different optical paths. A tray containing a library file of microfiche film is inserted into a reader, and operated until a selected microfiche is brought adjacent an extractor mechanism. The extractor withdraws the microfiche from the cartridge and passes it through the reader until a selected image comes into the optical path where it is projected onto a screen. A number of mechanical features protect the lens and facilitate a change of light source.

The nature of a preferred embodiment of the invention may be understood best by a study of the attached drawing wherein.

Figures 1, 9:
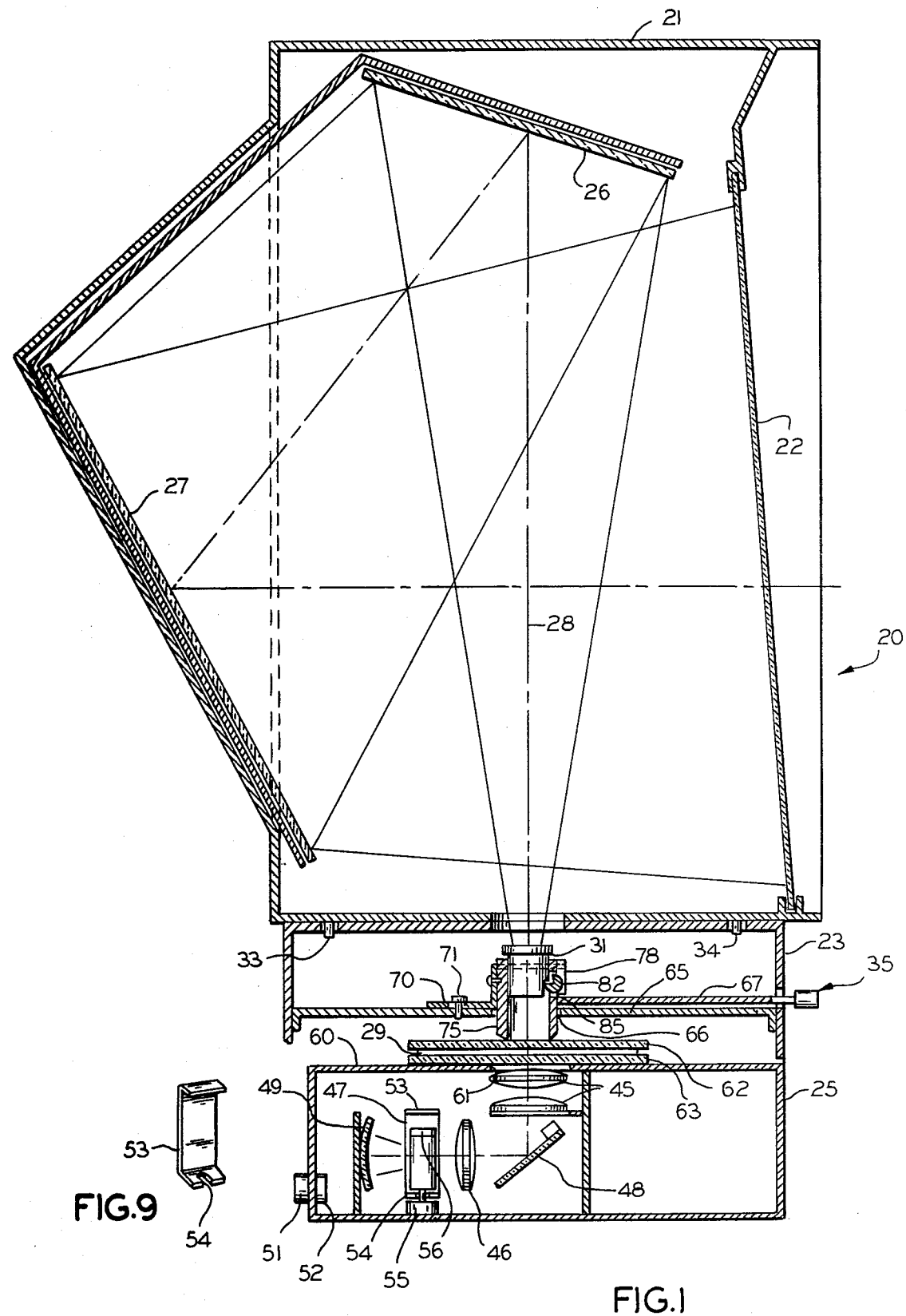
FIG. 1 is an elevation schematic disclosure of the optical path in the inventive microfiche reader.
Figure 4:
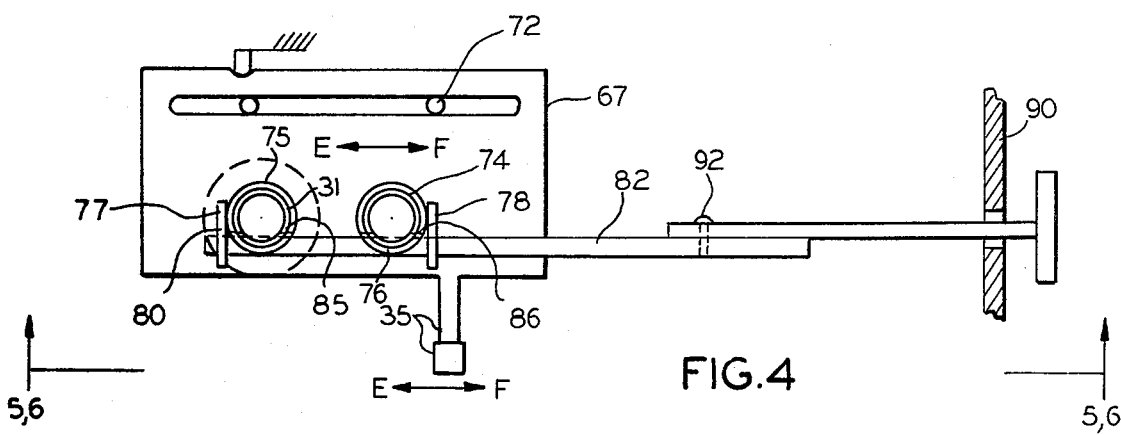
FIG. 4 is a plan view of a pair of image lens and of a focusing mechanism.
Figure 5:
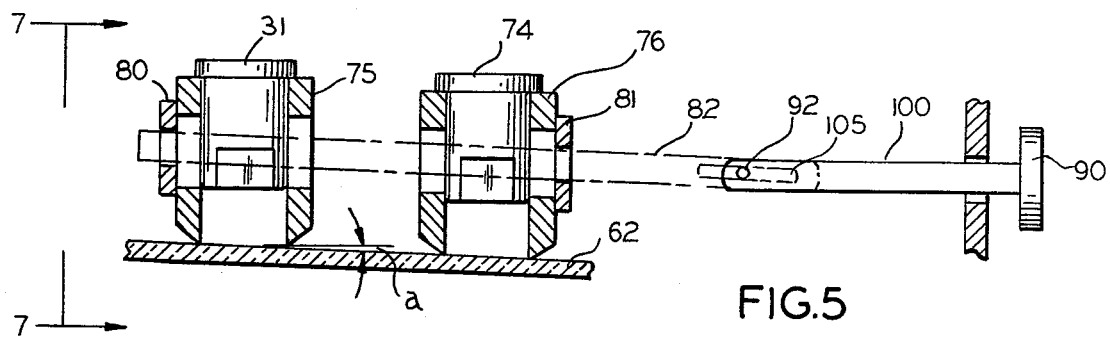
Figure 6:
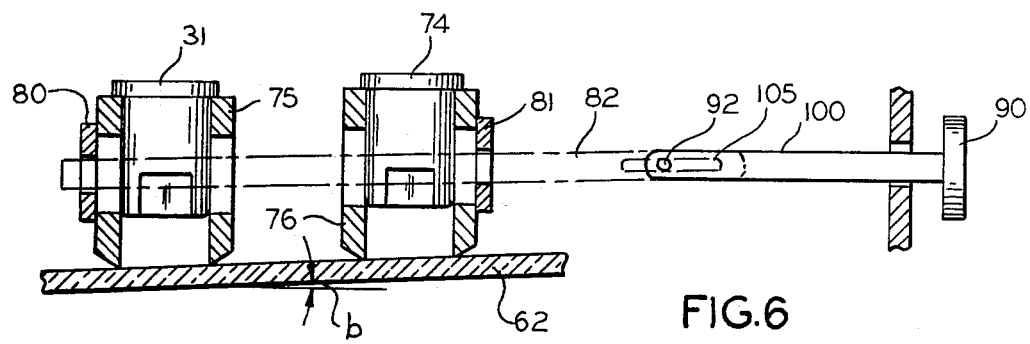
Figure 7:
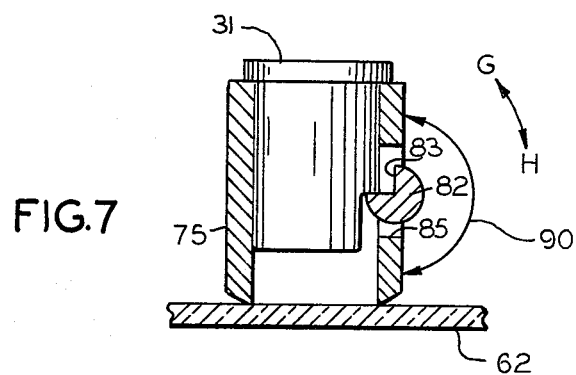
Figure 8:
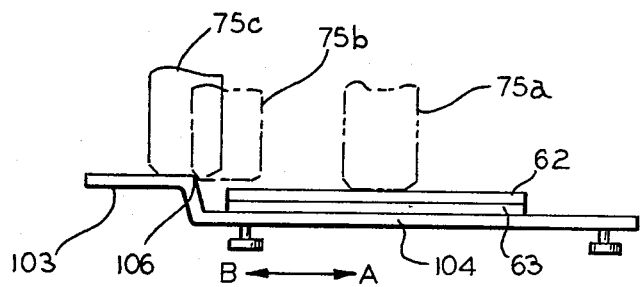

FIG. 5 schematically shows a front elevation view taken along line 5—5 of FIG. 4, illustrating how accurate focusing is maintained when mechanical parts are misaligned in one direction;

FIG. 6 is a similar schematic view showing the maintenance of accurate focusing when misalignment is in an opposite direction;

FIG. 7 is a schematic side view (taken along line 7—7 of FIG. 5 of the focusing mechanism for selectively raising or lowering the image lens;

FIG. 8 is a schematic diagram showing how image forming lens holders slide over a glass carrier without chipping the edge of the glass; and FIG. 9 is a detail view of the lamp extractor shown in FIG. 1.

With reference to FIG. 1, the major assemblies or modules of the inventive microfiche reader 20 are a hood 21, screen 22, housing 23 and lamp tray 25. The modulator hood 21 is a hollow box which includes a number of mirrors 26, 27 defining a folded optical path having a center axis 28 over which an image is projected from microfiche 29 and onto screen 22. The screen may be ground glass or an equivalent plastic material.

Figure 2:
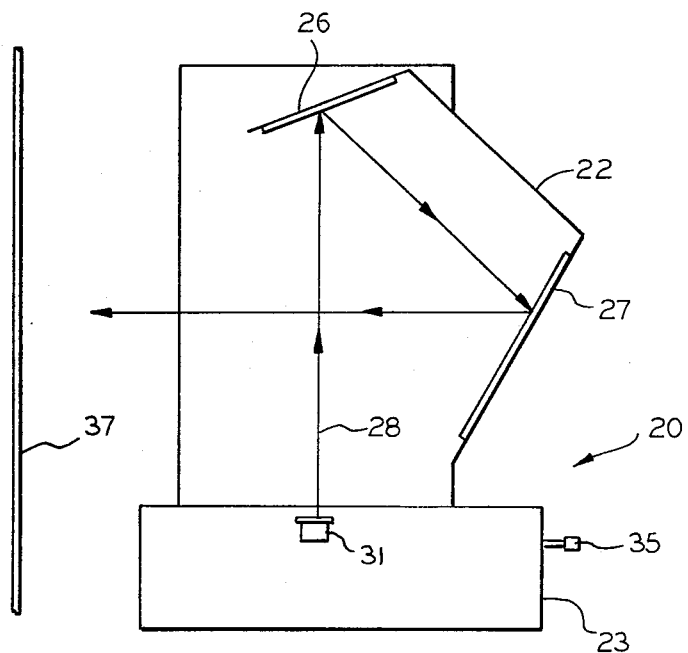
FIG. 2 is a schematic view of the microfiche reader of FIG. 1 rearranged to project onto a wall.

When an image on a microfiche film is placed under image forming lens 31, that image is projected over the folded path in the hood and onto the screen 22, where the units are set up as shown in FIG. 1. In greater detail, it should be noted that the hood 21 includes a pair of pins 33, 34 on the underside thereof which fit into mating holes on top of the base unit or housing 23. Hence, the hood may be placed over the base unit 23 with the viewing screen 22 facing the reader controls 35. This way the operator may look at the picture projected onto screen 22 while manipulating the controls. Alternatively, the hood 21 may be picked up and rotated 180° so that pins 33, 34 reverse their positions (as viewed in FIG. 1). This way the self contained reader screen 22 may be removed, and the image may be projected onto a wall or separate screen 37 (FIG. 2).

Figure 3:
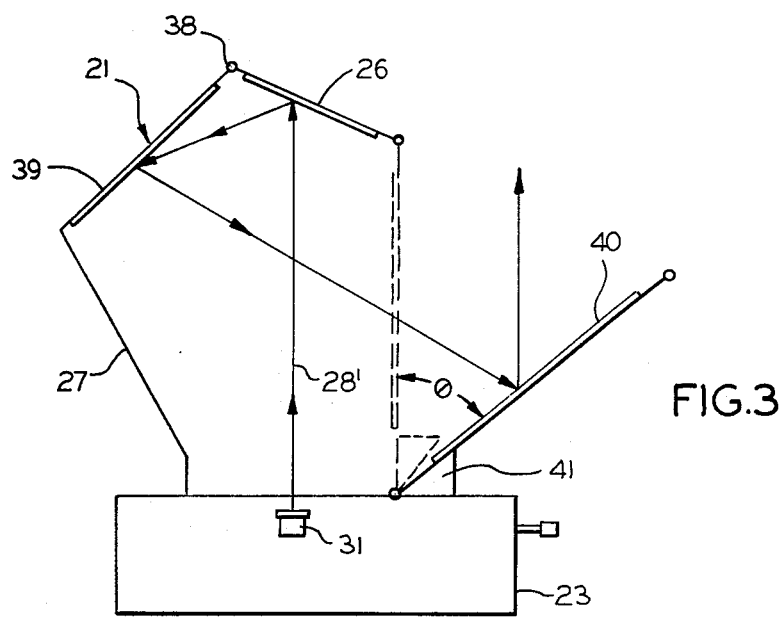
FIG. 3 is a second schematic view of the microfiche reader projecting on the ceiling.

Referring to FIG. 3, the mirror 26 is pivoted at point 38, and the angle of reflection is changed so that the optical path 28' is reflected into another mirror 39 in hood 21, which is trained on yet another mirror 40 that may be substituted for the self-contained reader screen 22. The mirror 40 may fold down into a position which reflects the projected image onto the ceiling, or (by adjusting angle $\theta$) onto any suitable overhead screen. Any suitable support 41 may be built onto mirror 40 to fix the angle $\theta$. The hood 21 may be rotated to either of the positions of FIGS. 1 or 3 so that the ceiling or overhead screen may be projected from either the control side 35 or the opposite side of the reader. Depending upon the number or mirrors used, it may be necessary to reverse or flip over the microfiche 29 in order to place the projected image in a proper and upright position.

The chassis of microfiche reader comprises a base unit (not shown) having the housing 23 superimposed thereon. The base unit includes the modular tray 25 having a pair of condenser lens arrangements 45, 46 for projecting the light of a lamp 47 via mirror 48. A reflector 49 is behind the lamp 47 to reflect the back light into the image and optical path 28. Mirror 48 is preferably a dichromic mirror which has the inherent capability of reflecting only the light rays of the electromagnetic spectrum, while refracting the heat rays. Thus, condenser lenses 45 remain cool, and the heat from lamp 47 is dissipated in the housing of tray 25.

Tray 25 glides on tracks (not shown) formed in the base unit. A connector 51 in the base unit mates with a corresponding connector 52 in the tray 25. Thus, to change lamp 47 it is only necessary to remove tray 25 and to replace it with another similar tray. This is important because certain modern lamps tend to break if handled owing to the salt normally found on human fingers. Accordingly, one person may be trained to replace lamps, but the casual operator does not have to touch the lamp. The trained person uses an extractor tool 53 having forked ends 54 for lifting the lamp 46 from a socket 55. A leaf spring 56 may snap over the top of the lamp 47 to hold it while the bulb is inserted into socket 55.

The tray 25 is covered by a plate 60 which slides into tracks (not shown) superimposed about the tray. A hole 61 in the plate 60 enables passage of a light beam from the condenser lens 45 to the image forming lens 31. On the plate 60 may be a grid which identifies the microfiche images. The plate 60 may be removed and inverted or replaced to identify any of many different sizes of microfiche image patterns.

A pair of glass plates 62, 63 are mounted on any suitable carrier 104 (FIG. 8) sliding in a horizontal plane between condenser lens 45 and image lens 31. The upper glass plate 62 may be lifted and a microfiche 29 may be placed between the glass plates. It should be apparent how the microfiche image is placed under glass plate 62 and under the image lens 31.

An image lens support plate 64 is mounted in a suitable manner inside housing 23 over hole 61 and condenser lens 62. A cutout or slot 66 in support plate 65 enables passage of light from condenser lens 45 to image lens 31. Over support plate 65 is a sliding lens selecting plate 67 having a slot 70 formed therein. A pair of screws 71, 72 (FIG. 4) fit through slot 70 and into threaded holes (not shown) in the plate 65. Thus, a lever and knob 35 may be slid in directions E, F (FIG. 4) to selectively slide plate 67 over plate 65 and thereby select between a pair of image lenses 31 or 74. Each lens provides a different magnification, such that one lens may project one size microfiche image and the other a different size microfiche image.

A pair of lens mounts 75, 76 are floatingly mounted on the plate 67, and are adapted to telescopically hold lenses 31, 74. Mounted on each lens mount 75, 76 are brackets 77, 78 (FIG. 4) having aligned bearings 80, 81 (FIG. 5) for receiving a focusing rod 82. An L-shaped groove 83 (FIG. 7) is formed in the rod 82 to fit into and bear against windows 85, 86 in the lens mounts 75, 76. A focusing thumb wheel 90 may be rotated in directions G, H (FIG. 7) to turn the rod 82. If the rotary motion is in direction H, the L-groove 82 lifts lens mounts 75, 76. Likewise, if the rotary motion is in direction G, the L-groove 83 lowers the lens mounts 75, 76. As the lens mounts raise or lower, the image is focused on the self-contained screen 22, ceiling, wall or remote screen 37. Lever and knob 35 and thumb wheel 90 fit through suitable slots in housing 23.

Means are provided for insuring a proper focus of the microfiche image on the screen 22, ceiling, or remote screen 36. Briefly, all mechanical parts are certain to have manufacturing tolerances. The looser the tolerance, the lower the cost. Therefore, it is desirable for the image lenses 31, 74 to have a focal length which maintains a constant focus independent of these tolerances.

Proper focusing requires that the image lens mounts or carriers 75, 76 should ride freely upon the top of glass plate 62. The opposite sides of the glass are exactly parallel, and thickness of the glass is fixed. The microfiche is held firmly against the underside of the glass plate 62. Hence, the image lens 31 and the microfiche always have the same spacial relationship if the lens mounts 75, 76 merely float on the top of the glass 62. The bottoms (FIG. 8) of the lens mounts 75, 76 are rounded or otherwise shaped to enable the lens to glide over the surface of glass 62. The surface of glass 62 is coated to provide substantially friction free contact with lens mounts 75, 76.

For the foregoing reasons, the lens mounts 75, 76 sit loosely in sockets on plate 67. Focusing rod 82 is supported by bearings 80, 81 on the loose lens mounts. A pivot point 92 frees focusing rod 82 from any rigid alignment with housing 23 and allows the focusing rod 82 to tip to any position fixed by the bearings in brackets 80, 81.

The operation of the floating mounts is explained by FIGS. 5 and 6, which have been drawn with greatly exaggerated errors, merely to illustrate the problems and their solutions provided by the present invention. In greater detail, in FIG. 5 the accumulations of mechanical tolerances are such that the glass 62 tips downwardly toward the right at an angle "$a$," and in FIG. 6 the glass 62 tips at an opposite angle "$b$." In both cases, the lens mounts 75, 76 set squarely in contact with the glass plate 62. Focusing rod 82 tips at pivot point 92 relative to rod 100. Hence, rod 82 is also maintained parallel to the surface of glas plate 62. Thus, the optical axes of the lenses 31, 74 are always held perpendicular to the surface of the microfiche pressed against the underside of the glass 62, and at the same distance therefrom. Pivot point 92 slides laterally in a slot 105 provided in rod 100 to accommodate the various lateral positions of focusing rod 82 when either lens 31 or lens 74 is positioned over condenser lens 45.

To replace a microfiche between glass plates 62, 63, it becomes necessary to remove the plates from beneath lenses 31, 74, and separate the plates. To accomplish this purpose, the carrier 104 (FIG. 8) supporting glass plates 62, 63 is moved to the right until the plates are out from under the lenses. However, since lens mounts 75, 76 float freely on the surface of the glass they will tend to ride off and chip the edges of the glass. The same chipping may occur when glass plates 62, 63 are returned to their position beneath lenses 31, 74.

To alleviate this problem, a shelf 103 (such as stainless steel) is formed on the back of carrier 104 for the glass plates 62, 73. This shelf 103 receives and supports the lens mounts 74, 76 when the carrier 104 is moved in direction "A" (i.e., out from under the lens mounts). More specifically, at the position 75a, the lens mount rests upon and slides over the surface of glass plate 62 as it is moved to locate a microfiche image.

As the carrier 104 is pulled in direction A the lens mount in position 75b engages the shelf at a tapered portion 106. At 106, the edge between the shelf 103 and the lens mount are in the shape of mutually inclined planes. Thus, the lens mount is lifted to the position 75b, since the plane of shelf 103 is slightly higher than the plane of glas plate 62. Finally, the carrier 104 reaches the outward extremity of its movement in direction A and the lens mount in resting in position 75c upon the stainless steel shelf 103.

The microfiche carrier glass plate 62 is now lifted in any suitable manner. The microfiche is removed, cleaned, replaced or otherwise adjusted. Then, glass plate 62 is lowered and carrier 104 is pushed back in direction B. The lens mount 75 returns over the path indicated by the three positions 75a-75c to the reading position. It should be noted that, as the lens mount 75 crosses the edge of the glass plate 62, it is lifted, away from the edge of the glass surface. Hence, the glass edge is never touched by the sliding lens mount. In addition, since the difference in heights between the plane of shelf 103 and glass plate 62 is minute, the lens mount is gently returned to the surface of glass plate 62 when the carrier 104 is moved in direction "B."

Those who are skilled in the art will readily perceive how various modifications may be made. Therefore, the appended claims are to be construed to cover all equivalent structures.

I claim:

1. A modular system forming a microfiche image reader having:
   a housing with a modular hood means superimposed thereon, said housing comprising modular parts which may be replaced or interchanged;
   optical projection means in said housing including a first module means including a source of light having at least a condenser lens, and a bulb which should not be touched by a human hand, said first module means being replaced as a unit, magnification means for projecting said light in a path from said housing, and means for supporting a microfiche in said path;
   said modular hood means is removably seated on said housing in any of at least two different orientations;
   corresponding aperture means in abutting top and bottom walls of said housing and said modular hood means respectively said modular hood means being located in said light path whereby an image of a microfiche in said support means in said light path is projected into said modular hood means through said aperture means regardless of the orientation of the modular hood means on said housing;
   a plurality of reflecting means in said modular hood means for projecting said light along a selected folded path, in one of several different directions depending upon the selected orientation of the hood means; and
   releasable connecting means extending between said modular hood means and said housing for enabling said modular hood means to be removed from said housing and either be moved from a first orientation through 180° to a new orientation or be replaced by a second modular hood means,
   said releasable connecting means comprising a pair of spaced apertures in said top wall of said housing and a mating pair of pins in said bottom wall of said hood means, said apertures and said pins being on either side of and equidistant from the center of said corresponding aperture means whereby said modular hood means may be removed and rotated through 180° or replaced by another modular hood means.

2. The microfiche reader of claim 1 wherein said hood means comprises a dark box terminating in a back lighted screen for receiving said projected light path on its rear side and displaying to view on its opposite side.

3. The microfiche reader of claim 2 wherein said screen is removable, said light path being projected out of said hood means and onto a vertical wall or separate screen.

4. The microfiche reader of claim 1 wherein said hood means comprises a removable screen for receiving and displaying said projected light path, and second means comprising a mirror which may be substituted for said screen to project said light path out of said hood means and onto an overhead screen.

5. The microfiche reader of claim 4 wherein said second means projects said light path onto a ceiling.

6. The microfiche reader of claim 1 wherein said second hood means includes:
   a plurality of side and top panels;
   reflecting means fixed to several of said panels;
   one of said panels being a vertical panel having a reflecting means fixed thereto;
   said vertical panel pivotally connected at its lower end to said hood;
   another of said panels being a side panel having a reflecting means fixed thereto for reflecting said light along a path leading into a substantially vertical direction from said second hood means when said vertical panel is pivoted through substantially 45° from the vertical.

7. A microfiche image reader having a housing;
   optical projection means in said housing including a source of light mounted in a replaceable tray and magnification means for projecting said light in a path from said housing;
   means on said housing for locating and supporting a microfiche in said projected light path;
   hood means removably seated on said housing in any of several orientations;
   corresponding aperture means in said housing and said hood means and located in said light path whereby said light path is projected from said source of light through said microfiche and into said hood means via said aperture means;
   said hood means including a plurality of side and top panels;

reflecting means on said panels;
one of said panels being a vertical panel having a reflecting means fixed thereto;
said vertical panel being pivotally connected at its lower end to said hood means;
means on said vertical panel for setting said vertical panel to a preselected angle;
another of said panels being a side panel having a reflecting means thereon for reflecting said light path within said hood means, said light path emerging from said hood means after reflection from said vertical panel reflecting means in a substantially vertical direction when said vertical panel is pivoted and set at an angle which is substantially 45° from the vertical.

* * * * *